United States Patent

[19]

McIntyre

[11] Patent Number: 6,125,743
[45] Date of Patent: Oct. 3, 2000

[54] NUT PROCESSING APPARATUS

[76] Inventor: John Cross McIntyre, Coles Creek Road, Cooran, Queensland 4569, Australia

[21] Appl. No.: 09/135,289

[22] Filed: Aug. 17, 1998

[30] Foreign Application Priority Data

Aug. 15, 1997 [AU] Australia .................................. P08637
Nov. 5, 1997 [AU] Australia .................................. PP0253

[51] Int. Cl.⁷ .................................................. A23N 5/00
[52] U.S. Cl. .................................. 99/576; 99/580; 99/582
[58] Field of Search ........................... 99/574, 576, 580, 99/581, 568, 582

[56] References Cited

U.S. PATENT DOCUMENTS

| | | | |
|---|---|---|---|
| 1,510,575 | 10/1924 | Anthony et al. | 99/576 |
| 1,921,238 | 8/1933 | Milam | 99/576 |
| 4,321,865 | 3/1982 | Ramseier | 99/576 |
| 4,928,590 | 5/1990 | Joyama et al. | 99/576 |

*Primary Examiner*—Reginald L. Alexander
*Attorney, Agent, or Firm*—Howell & Haferkamp, LC

[57] ABSTRACT

An apparatus for processing hard-shelled nuts and a method therefore. A nut processing apparatus has a plurality of mechanical grippers moving in a continuous loop, each gripper configured to carry a nut through a plurality of processing stations. A conveyor system sequentially transports single nuts from a hopper to a position where the mechanical grippers may engage each nut and begin the processing cycle. Once engaged, the grippers carry the nuts to a grooving station where a grooving blade is brought into contact with the shells of the nuts. Once the grooving blade is in contact with the shells, the grippers rotate the nuts one complete revolution, thereby cutting a groove in the peripheries of the nuts. The grippers then carry the nuts to a splitting station, where splitting blades are brought into contact with the shells of the nuts where the grooves have been cut, thereby splitting the shell into two parts. The grippers carry the split shell to a collecting station where the shell is separated and the nut kernel is collected for processing. The shells are carried by the grippers to a dumping station where the shells are discarded. The grippers then engage another nut and the process continues with the various nuts in the plurality of grippers being simultaneously processed at different stations.

22 Claims, 10 Drawing Sheets

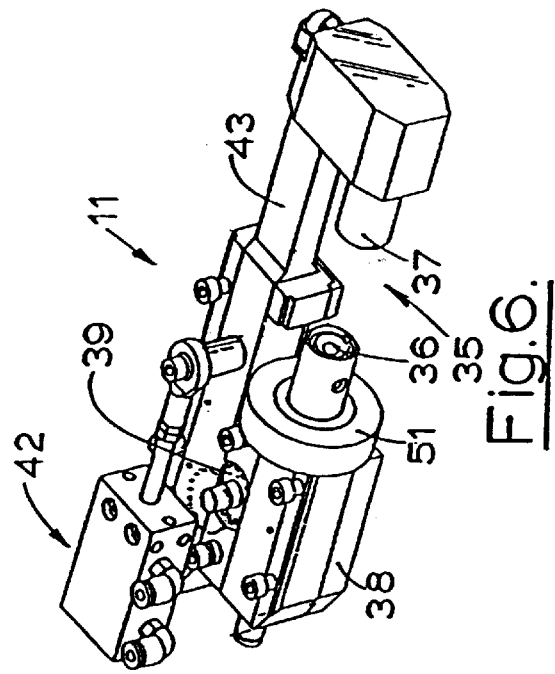
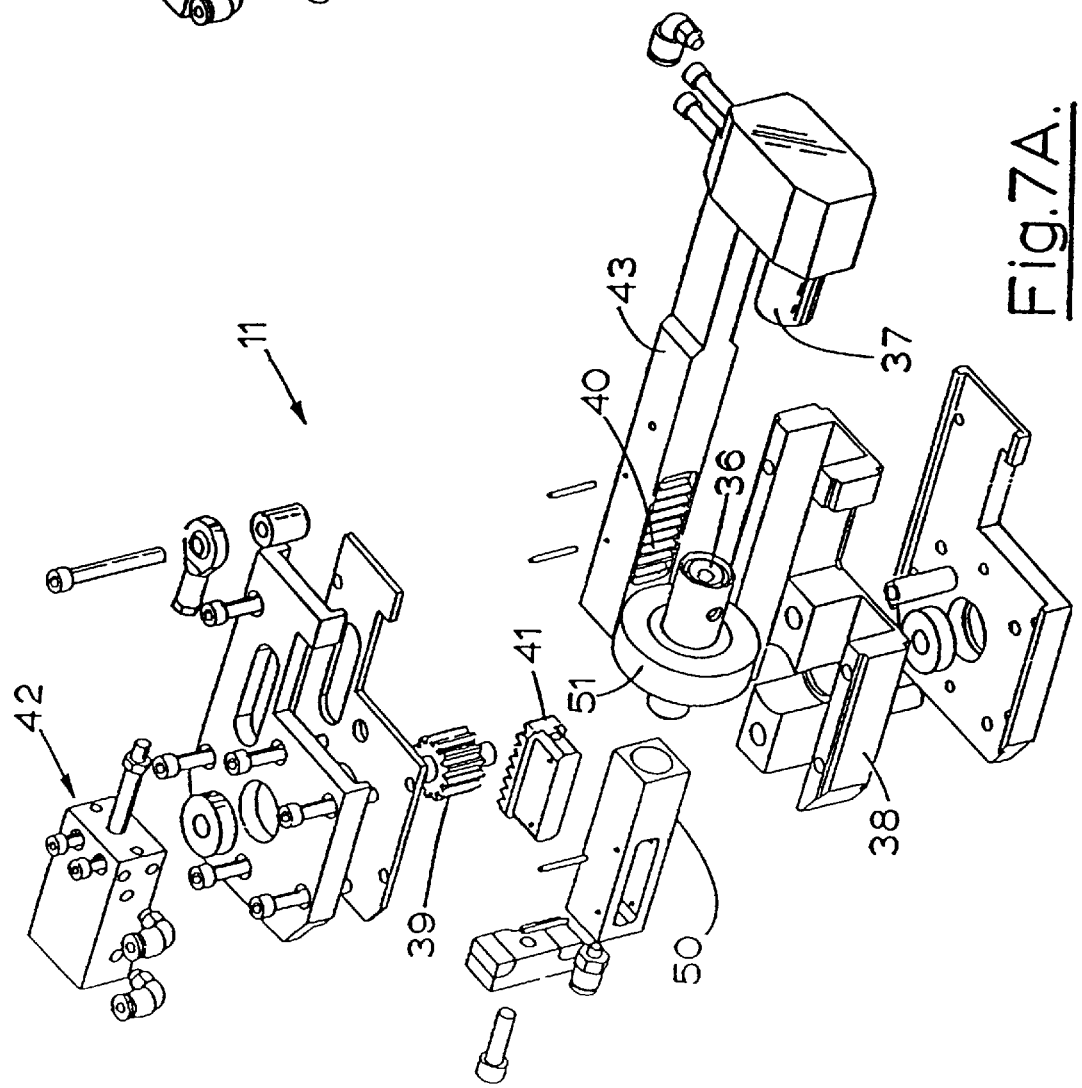
Fig.6.
Fig.7A.

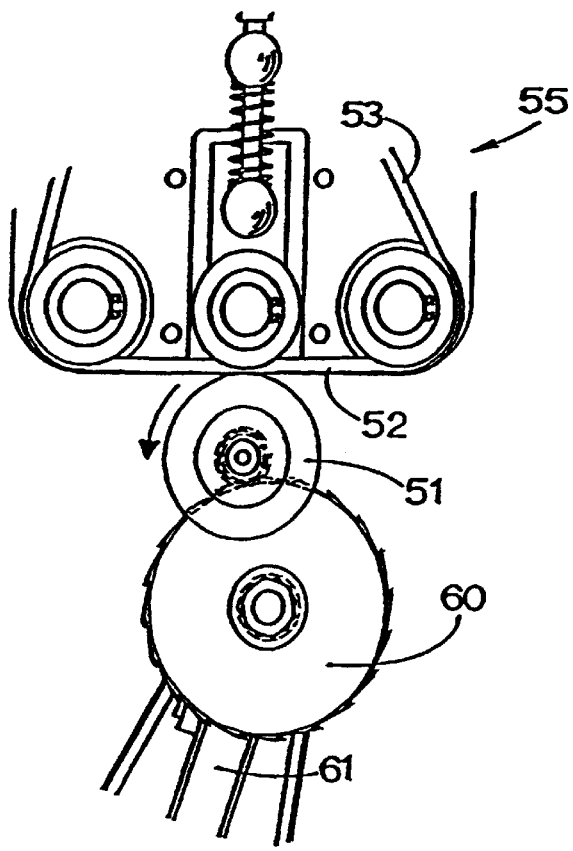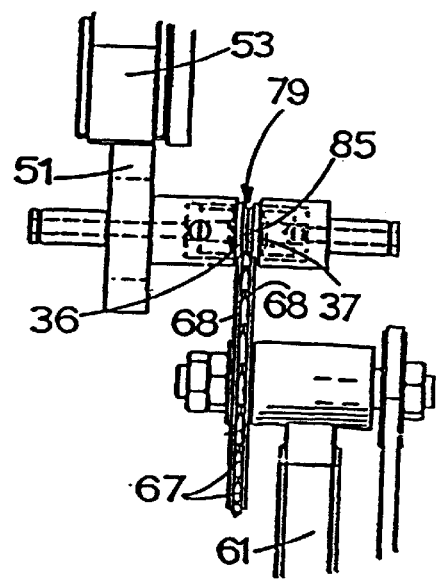
Fig.11A.
Fig.11B.
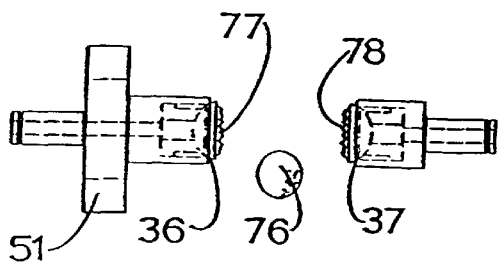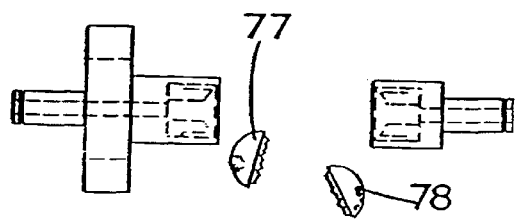
Fig.13A.
Fig.13B.
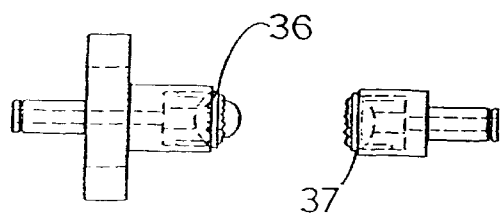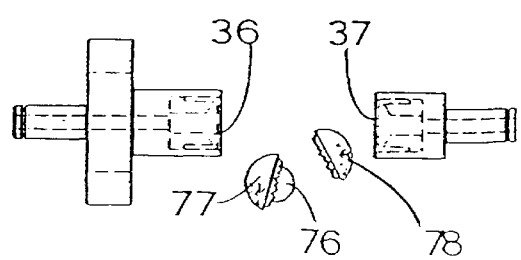
Fig.13C.
Fig.13D.

NUT PROCESSING APPARATUS

BACKGROUND OF THE INVENTION

This invention relates to processing apparatus.

This invention has particular but not exclusive application to processing apparatus for opening hard shelled nuts and in particular macadamia nuts and for illustrative purposes references will be made to such application. However, it is to be understood that this invention could be used in other applications, such as for opening coconut shells.

Nuts such as macadamia nuts have a hard shell about a relatively fragile kernel. The value of the processed nut kernel is increased if clean whole nuts result are obtained from the removal process. While part kernels are retained for sale the value of half kernels is greater than that of broken kernels.

Macadamia nut shells are generally spherical but vary in shape and size and are frequently dried prior to opening so as to free the kernel from the shell with a view to recovering whole kernels. The drying process which occurs over several days is costly and causes extreme hardness of the shell.

The presently available automated cracking and separating apparatus tends to produce a high proportion of damaged kernels and results in the harvested kernels being contaminated by fragmented shell particles which may be contaminated by contact with the ground surrounding the trees, as organic fertilizers are often used to fertilise the trees.

U.S. Pat. No. 4,467,711 describes a method of and apparatus for cracking nuts utilising a conveyor elevating nuts at fixed spacing to a nut gripping and cracking apparatus. The conveyor comprises slats with openings to receive a nut and a support beneath the nut. The conveyed nuts pass to a cracking apparatus having respective blades which are brought together by hydraulic pressure to cause the blades to split the nut. A blade position sensing device limits blade travel after the nut is split.

Such apparatus has several disadvantages. Firstly, splitting of the nuts by compression between the blades results in brittle failure of the nut shell, resulting in a highly energetic shock. This tends to shatter the nut and the kernel. The shattered nut produces contamination of the kernel and especially when the kernel is also shattered by the splitting apparatus.

The apparatus is also limited in its line speed, and is therefor arranged in multiple assemblies to provide commercial throughput. One major limitation on the line speed is the stepwise nature of the method, requiring the nut to stop at the cutting station, introducing inertial delays and causing further damage to the kernels.

The present invention aims to alleviate at least one of the foregoing disadvantages and to provide nut processing apparatus which will be reliable and efficient in use.

BRIEF SUMMARY OF THE INVENTION

With the foregoing and other objects in view, this invention in one aspect resides broadly in nut processing apparatus including:

nut gripping means adapted to secure a nut with a portion of the nut surface exposed;

nut grooving means adapted to groove said exposed nut surface portion;

nut splitting means adapted to cooperate with said nut groove to split said nut.

The gripping means for each nut may comprise any suitable gripping means capable of supporting the nut with a surface portion to be grooved exposed. Preferably the gripping means is configured to present a circumferential exposed portion whereby the nut may be grooved circumferentially and preferably about a substantially diametrical portion of the shell.

The gripping means may comprise opposed gripping elements adapted to support the nut. For example, the gripping means may comprise opposed cups of rigid or resilient material adapted to engage a nut therebetween. The cups may be configured to engage the nut without any additional retaining means. Alternatively the cups may be provided with vacuum means adapted to retain the nut or respective nut portions pneumatically.

Preferably one of the cups is driven for rotation and the other said cup is capable of orbital rotation about the drive axis of the driven cup so that non-spherical form nuts may be retained for rotation about the drive axis of the driven cup. Preferable the other cup is supported on a spherical bearing or the like mounted co-axially with the drive axis so that it may deflect off centre when engaged with a non-spherical nut located in the driven cup. It is also preferred that the other cup be resiliently biassed to a position co-axial with the driven cup.

In another embodiment of the present invention the gripping means comprises one or more opposed pairs of mechanical grippers operable to engage the nut whilst presenting an exposed surface portion for grooving. The mechanical grippers may be individually configured to frictionally engage the nut surface, a static maintenance of the grip being maintained by force applied between the mechanical grippers. Alternatively, the mechanical grippers may comprise substantially opposed teeth or points adapted to penetrate the nut surface.

In a yet further embodiment the grippers may engage the nut shell with force as to secure the nut by indentations made therein.

The mechanical grippers may be operated by any suitable means including pneumatic, hydraulic or electromechanical operating means. The gripping means may be spring returned to an inoperative attitude, the working of the gripping means against the spring bias being by any suitable means such as cams, fixed-station pneumatic operating means or the like.

Alternatively when the nut shells are to be released, the gripping means may pass stationary unlocking means which forces the gripping means apart. In such arrangement, the gripping means may be spring biased toward the engaged position. The operation of the gripping means during passage about a cyclic path supported by conveying means such as a wheel, endless chain or belt may be effected by means of a suitable fixed camming surface engaging a suitable follower associated with the gripping means.

In order for the mechanical grippers to access the nut the distributing means may be configured to cooperate with gripping means to effect transfer of the nut from the distributing means to the nut gripping means. In the case of grippers which cannot by their nature obtain a closed grip on the nut directly from the distribution means, there may be provided nut transfer means adapted to support the nut for disengagement from the nut distribution means and engagement with the nut gripping means.

Preferably, the nut transfer means is adapted to locate the nut for acquisition by the nut gripping means. For example, the nut distribution means may be provided with opposed access openings whereby the nut transfer means may acquire the nut, clear the distribution means and locate the nut for gripping by the gripping means.

For example, the gripping means may be associated with a pair of opposed nut locating pins adapted to substantially diametrically locate the nut for clearance from the distribution means. Preferably, such nut locating pins are provided with a concave nut engaging surface adapted to encourage position prior to engagement of the nut gripping means. The pins may be operable by any selected means such as electromechanical, hydraulic or other actuating means. For simplicity, the pins may be operable by cam action against a spring loading, the camming action being provided by passage of the preferred continuous belt or chain past a fixed camming surface.

The gripping means may be utilized in multiples of such gripping means on endless conveying means such as a wheel, continuous belt or chain whereby continuous collection and processing of nuts may be effected. The gripping means may comprise matched pairs of cooperating assemblies one of each pair being mounted on cooperating drive chains or belts.

It is preferred that the gripping means be configured to accommodate a wide range of nut sizes or irregularly shaped nuts. Typically, such apparatus maybe configured to process macadamia nuts of about 18 mm diameter to about 35 mm diameter. If desired, the apparatus may be adapted for substitution of gripping means which accommodate larger nuts.

It can be seen that the nut distribution and gripping apparatus may have many applications in the nut processing area apart from processing to kernels. Accordingly, in a further aspect of the present invention provides nut handling apparatus comprising distribution means adapted to provide a substantially continuous supply of nuts and a plurality of nut gripping means adapted to sequentially receive nuts from said distribution means and convey the nuts sequentially to one or more processing stations. The nut gripping means may include transfer means adapted to engage and locate a nut to be gripped, and gripping means adapted to secure a transferred nut.

The nut grooving means may take any suitable form for the purpose. For example, the nut grooving means may comprise a knife-like arrangement for relatively soft nuts or a saw-like or grinding arrangement for hard nuts. Preferably the nut grooving means is adapted to circumscribe the nut about its girth, although for certain nuts only part-circumferential grooving may be required.

The nut grooving means may comprise a fixed grooving implement against which a nut is engaged with rotation thereof via the gripping means. In this case, the nut may be rotated by driving of the gripping means, or alternatively may be rotated by engagement of the nut by driving means, whereby the gripping means may rotate idly. The driving means may comprise the grooving means itself in the case of rotary saw or grinding wheels, suitably reacting against drag in the gripping means or against drag of a reaction wheel disposed opposite the grooving point of the saw or grinding wheel.

Alternatively, the grooving means may travel across or about the nut to the degree of grooving required. If necessary, there may be provided more then one grooving means to avoid mechanical conflict with the conveying means such as a wheel, chain or belt supporting the preferred plurality of gripping means.

The grooving means may be configured to groove the nut to a predetermined absolute depth or may be under the control of means adapted to determine the grooving depth for a particular nut size or type.

The splitting means may be selected with reference to the nut type and the nature of the groove imparted by the grooving means. For example for some nuts, a knife-score type groove may respond to splitting means comprising stressing the shell between short-stroke compression members, whereby the nut fails at the score line without much displacement of the shell portions.

However, it is preferred that the splitting means enter the groove and spread the opposite sides thereof to achieve splitting of the nut. Such coaction may comprise a wedge-like splitting blade adapted to cooperate with the shoulders of the groove, with or without cooperation with the base of the groove, to effect splitting of the nut shell.

Alternatively, the splitting means may comprise a member adapted to enter the groove and then twist out of the plane of the groove, thereby forcing the groove walls apart until the nut shell fails mechanically. It is preferred that a reactive member is present for torque splitting.

The splitting means may comprise a pair of splitting members and the respective members may comprise a fixed member and a moving member, or a pair of moving members as desired. After splitting the split shell portions may be allowed to fall from the gripping means together with the nut kernel for post processing to separate the components. To this end gripping means not inherently adapted to allow falling passage of the nut portions may be provided with opening means adapted to allow release the nut portions. However, it is preferred that the gripping means be selected such that after the nut shell is split, the shell halves are retained by the respective gripping means. Thereafter the retained shell portions may be separated to allow clearance for discharge of the kernel therebetween.

Mounting of each complementary assembly of the gripping means on respective conveying means enables divergence in their travel path to effect separation of the shell portions. Alternatively, the gripping means may be formed to open to achieve discharge of the kernel.

Preferably, the kernel is allowed to drop from the separated shell portions into collection means disposed beneath the separating gripping means. In the case of nuts having a tendency to adherence of the kernel to the shell, the shell portions may be passed through a sensing means to determine whether an adhered kernel or part kernel remains in the shell. Any shell portion having retained kernel may then be ejected by release of the respective gripping means at a pre-determined position beyond the kernel dropping point, for further processing.

Alternatively, the apparatus may include kernel dislodging means adapted to encourage at least a portion of the adhered kernel to separate from the shell portion. For example, a scoop, screw or impacting device may engage or dislodge the kernel portion from the shell. Emptied shell may thereafter be ejected at a further point, whereupon the gripping means may cycle back foe collection of further nuts to be processed.

The nut gripping means is preferably one of a plurality of nut gripping means adapted to receive a continuous supply of nuts. A storage hopper may discharge nuts singly by virtue of an outlet cooperating with the gripping means to deliver one nut to each gripping means. Alternatively, the hopper may be associated with distributing means adapted to convey single nuts sequentially to the gripping means.

The nut gripping means may be integral with the distributing means. However it is preferred that the nut gripping means be adapted to receive nuts sequentially from the aforementioned distributing means and thereafter from the transport for the nuts through the splitting process.

In another aspect this invention resides broadly in a method of opening a hard shelled nut or the like, including:

securing a nut with a portion of the nut surface exposed;

grooving said exposed nut surface portion;

introducing splitting means into the formed groove for coaction with the opposed faces thereof, and causing the splitting means apply a separating force to the opposed faces of the grooves to split the nut.

BRIEF DESCRIPTION OF THE SEVERAL VIEWS OF THE DRAWINGS

In order that this invention may be more readily understood and put into practical effect, reference will now be made to the accompanying drawings which illustrate a preferred embodiment of the invention, wherein:

FIG. 6 is a perspective view of gripping means of the apparatus of FIG. 1;

FIG. 7A is an exploded view showing the components of the gripping means;

FIGS. 11A and 11B illustrate the grooving operation;

FIGS. 13A, 13B, 13C and 13D illustrate the kernel collection operation;

DETAILED DESCRIPTION OF THE INVENTION

Figure 1:
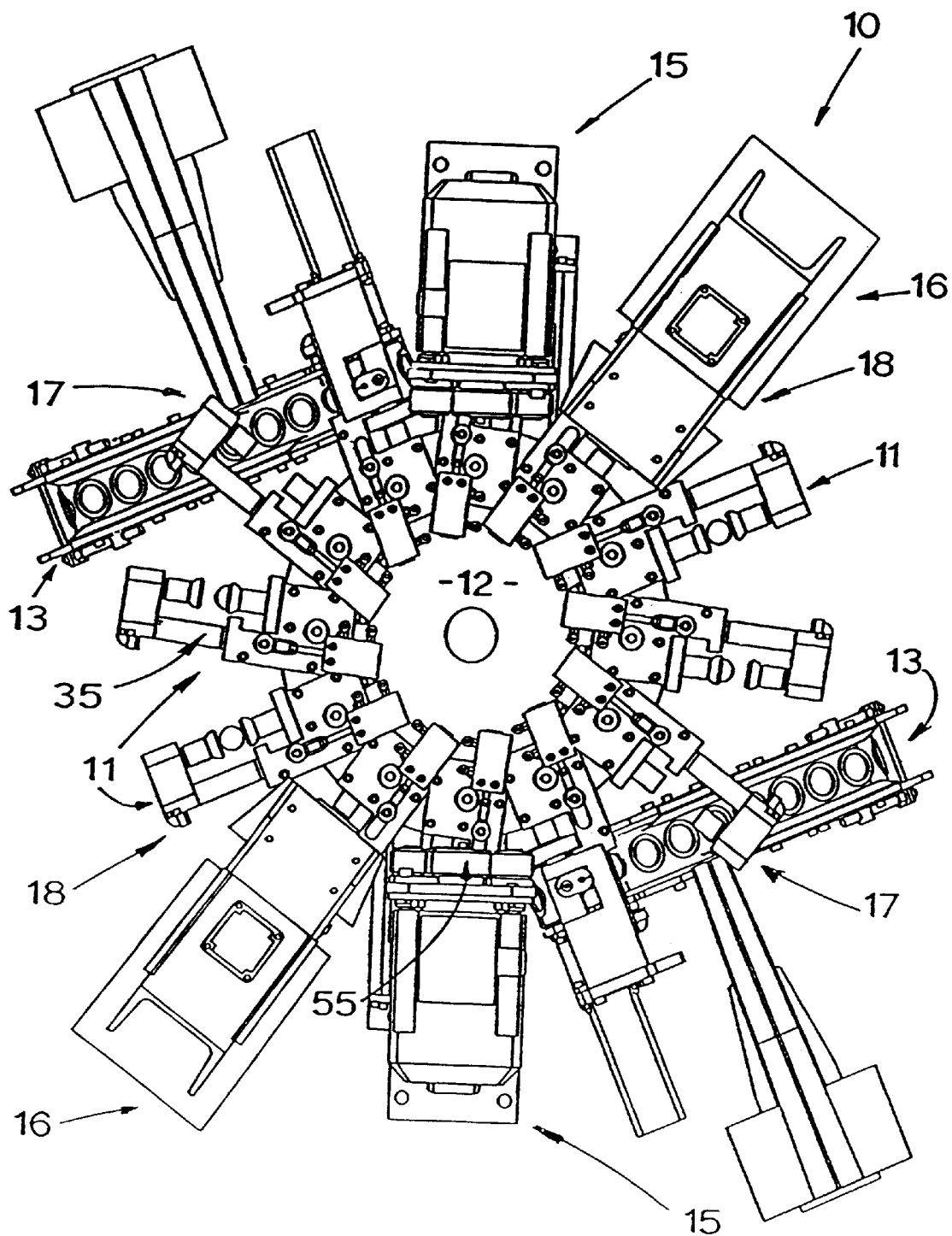
FIG. 1 is an overall plan view of one form of macadamia nut processing apparatus.
Figure 4:
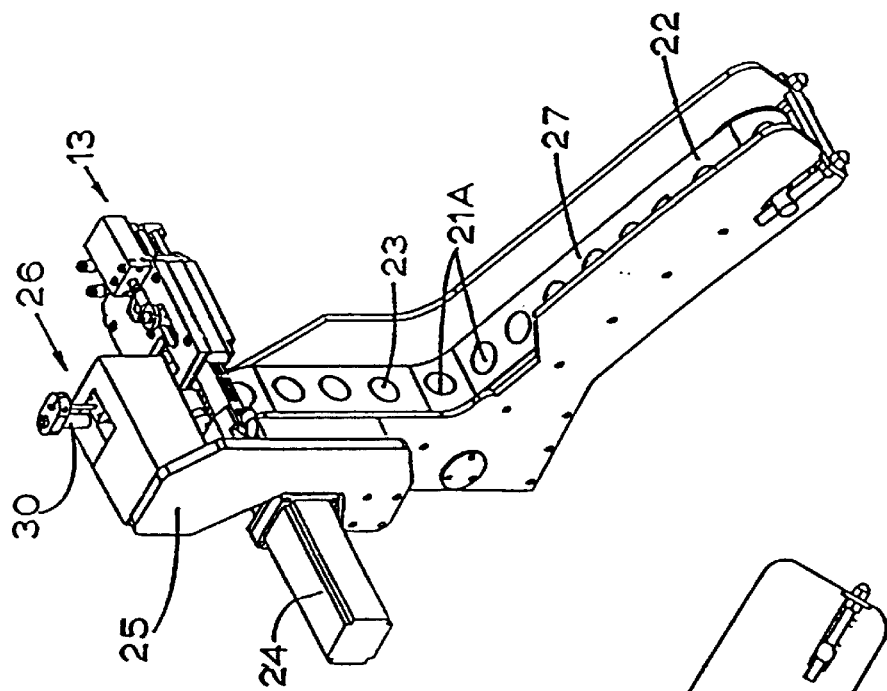
FIGS. 2 to 4 illustrate the loading conveyor of FIG. 1.
Figure 3:
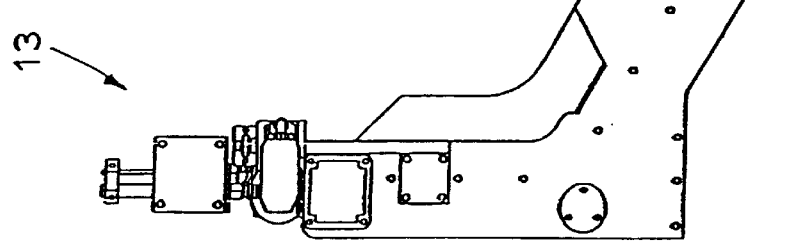
Figure 2:
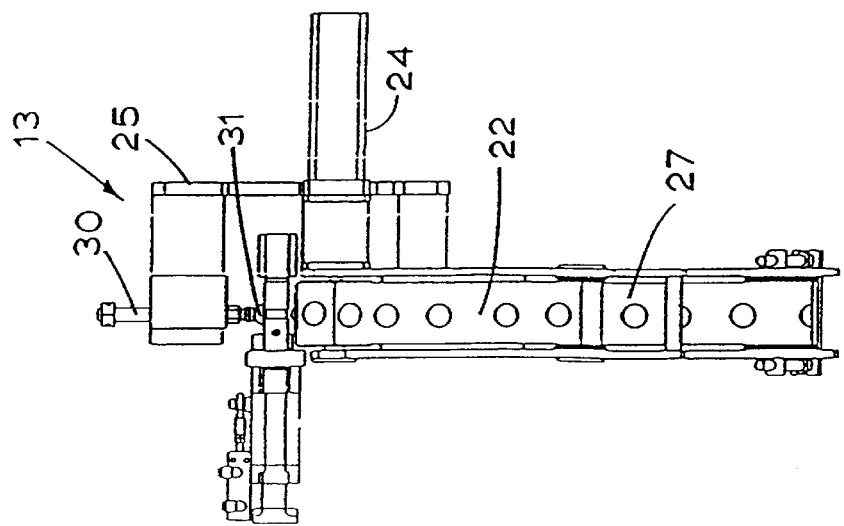
Figure 5:
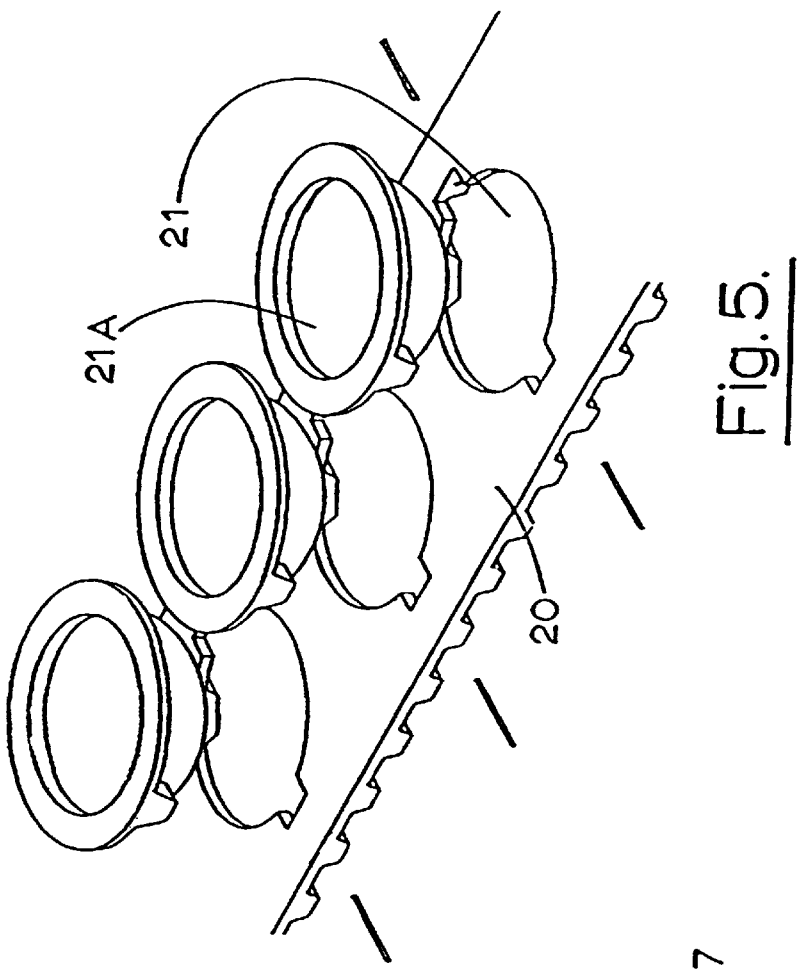
FIG. 5 illustrates the form of the toothed conveyor belt.

The macadamia nut processing apparatus 10 illustrated in FIG. 1 has a plurality of nut gripping assemblies 11 mounted removably to and radiating from a support wheel 12 which rotates to carry the nut gripping assemblies 11 cyclically and sequentially past processing stations arranged to cooperate with the gripping assemblies in a defined circular path 14 concentric with the support wheel 12. In this embodiment there are provided corresponding process stations at opposite sides of the wheel 12 so that each nut gripping assembly 11 is carried through two complete processes with every revolution of the wheel 12.

Each process starts at a loading station 17 at which individual nuts are conveyed by a belt conveyor assembly 13 to a position substantially coincident with the defined circular path 14. The individual nuts are carried by a respective nut gripping assembly 11 from the conveyor assembly 13 about the defined circular path 14 through a grooving station 15, a splitting station 16, a separating station 17 and an unloading station 18 at which kernels are delivered to a holding bin. Shell portions are retained for further movement about the defined circular path to a dumping station 19 for delivery of retained shell portions to a discharge bin before each gripping assembly 11 passes across the next conveyor assembly 13 for commencement of another cycle of operations.

Referring to FIGS. 2 to 5, it will be seen that the conveyor assembly 13 is a toothed belt conveyor in which the belt 20 is apertured at 21 to receive loading cups 21 which can only accommodate individual nuts. The lower run 22 of the conveyor is inclined and extends from a hopper (not shown) in which nuts are stored, to carry individual nuts through a vertical path 23, at which the nuts are retained by a suitable preventer to retain them in the cups, and across the top driven roller of the conveyor and which roller is driven by the servo motor 24.

An outrigger bracket 25 supports a plunger assembly 26 in spaced relationship with the upper extremity of the conveyor belt 27 to provide a gap therebetween through which the gripping assemblies 11 may pass to collect the nut from the upper extremity of the conveyor belt 20.

The plunger assembly 26 supports a vertically reciprocable loading plunger 30 provided with a vacuum pump 31 at its lower end which may be moved downward into engagement with the uppermost nut and then elevated to lift that nut into the defined circular path 14 where the nut may is positioned for gripping by the gripping means 35 of the respective gripping assembly 11.

In this embodiment, the gripping means 35 comprises a pair of opposed gripping cups 36 and 37 which are mounted for equal and opposite reciprocation in a radial direction on a slide body 38 mounted to the support wheel 12. The slide body supports a freely rotatable pinion wheel 39 engageable with gear racks 40 and 41 associated with the mounting cups 37 and 36 respectively whereby each cup 36 and 37 is constrained for corresponding movement to and from the defined circular path 14. Thus, different nut sizes may be gripped by the gripping means 35 and thereby be automatically positioned in the defined circular path 14 for co-operation with the various apparatus at the following processing stations.

An air cylinder assembly 42 mounted on the slide body 38 is adapted to reciprocate the outer arm 43 supporting the gear rack 40 and the gripping cup 37 for controlling the corresponding reciprocal movement of both cups 36 and 37, movement resulting from extension or retraction of the air cylinder assembly 42 being relayed through the racks and common pinion to both cups 36 and 37.

Figure 7B:
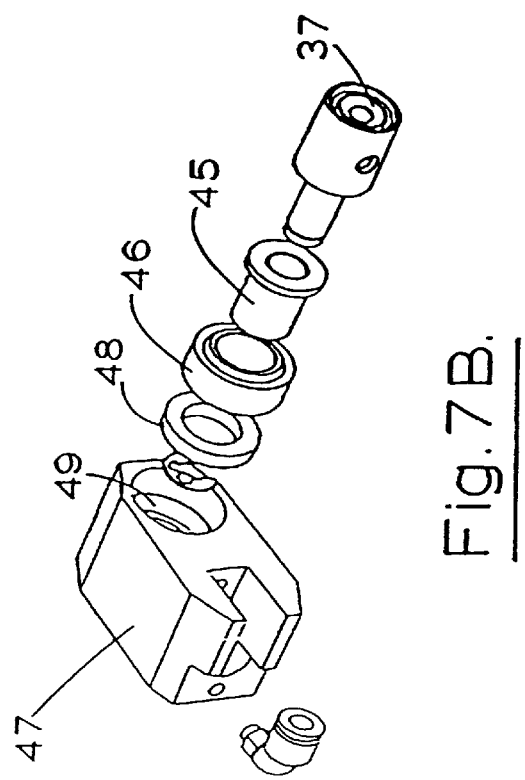
FIG. 7B is an exploded view of one cup assembly of the gripping means.

Additionally, each cup is provided with air supply means which may be used to create a vacuum to hold the nut or nut portions in the respective gripping cups. Alternatively, positive pressure may be applied to eject retained shells therefrom. Further construction details of the gripping assemblies 11 are illustrated in the exploded view in FIG. 7A. As macadamia nuts are not necessarily spherical in shape they can not be gripped accurately by gripping cups 36 and 37 supported for co-axial rotation. In this embodiment the outer cup 37 is supported for free rotation within a bush 45 which in turn is mounted in a spherical bearing 46 supported in an end housing 47 supported on the arm 43 whereby the cup 37 may deflect to an off-centre position for orbital motion about the rotational axis of the cup 36. This enables the outer cup 37 to engage operatively with a non-spherical nut shell.

Further, a resilient polyurethane washer 48 is interposed between the inner race of the spherical bearing and the back face 49 of the housing 47 so as to bias the bush 45 and thus the gripping cup 37 to a central position coaxial with the gripping cup 36 which is mounted for free rotation in the inner arm 50 which carries the gear rack 41.

This arrangement ensures that each gripped nut is gripped with its medial peripheral portion exposed at the defined circular path whereby it may coact with the grooving and splitting means.

A friction drive wheel 51 is supported coaxially and fixedly to the gripping cup 36 such that as each gripping means 11 moves around the defined circular path 14, the friction drive wheel 51 engages the lower run 52 of a broad driven belt 53 of a rotator assembly 55 supported at the grooving station 15.

A grooving blade 60 is carried on a radial arm 61 for movement to and from a central position beneath the rotator assembly 55 for engagement of the blade 60 with the shell of the nut carried between the gripping cups 36 and 37 so as to form a peripheral V shape groove about the nut. For this purpose the nut is counter driven by the friction wheel 51 with respect to the blade 60 at a speed which ensures that gripped nut rotates one full turn while in operative contact with the blade 60 to ensure formation of a continuous groove about the periphery of the nut.

Figure 8:
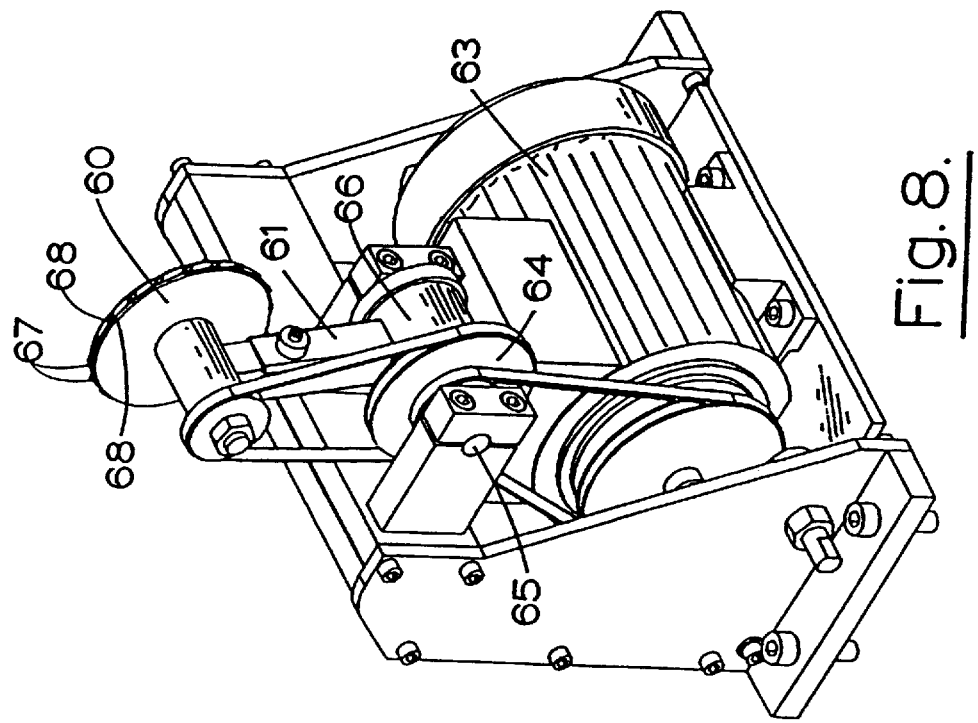
FIG. 8 is a perspective view of the grooving means of the apparatus of FIG. 1.
Figure 10A:
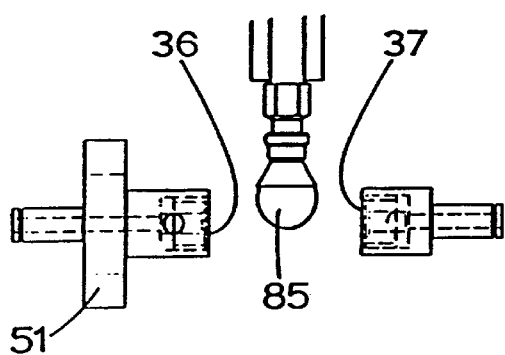
FIGS. 10A and 10B illustrate the nut loading action.
Figure 10B:
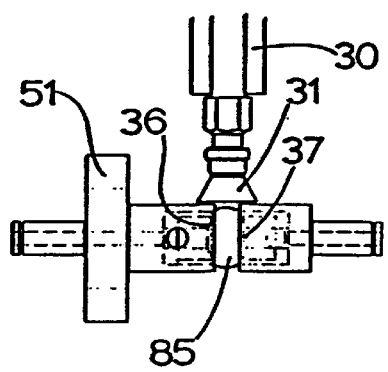

The cutting assembly illustrated in FIG. 8 and utilises a two stage step-up belt drive from a drive motor 63 so as to provide intermediate pulleys 64 coaxial with the pivot axle 65 of the arm 61. In this embodiment, an internal coil spring is mounted with the hub 66 to bias the blade 60 towards its cutting position.

It will be seen that the cutting blade includes teeth 67 which project outwardly from flat peripheral lands 68 at opposite sides thereof with the projection being equal to the desired depth of cut of the groove 79. Thus the teeth will cut into the shell to the desired depth until the peripheral lands 68 engage the nut to limit the depth of cut.

After each nut has passed through the grooving station 15, it proceeds to a splitting assembly 80 for coaction with upper and lower curved splitting blades 70 of which have inner edges 69 which converge in the direction of travel of the gripping means so as to engage in opposite sides of the formed groove 79 and capture the nut therebetween irrespective of normal size variations.

Figure 9:
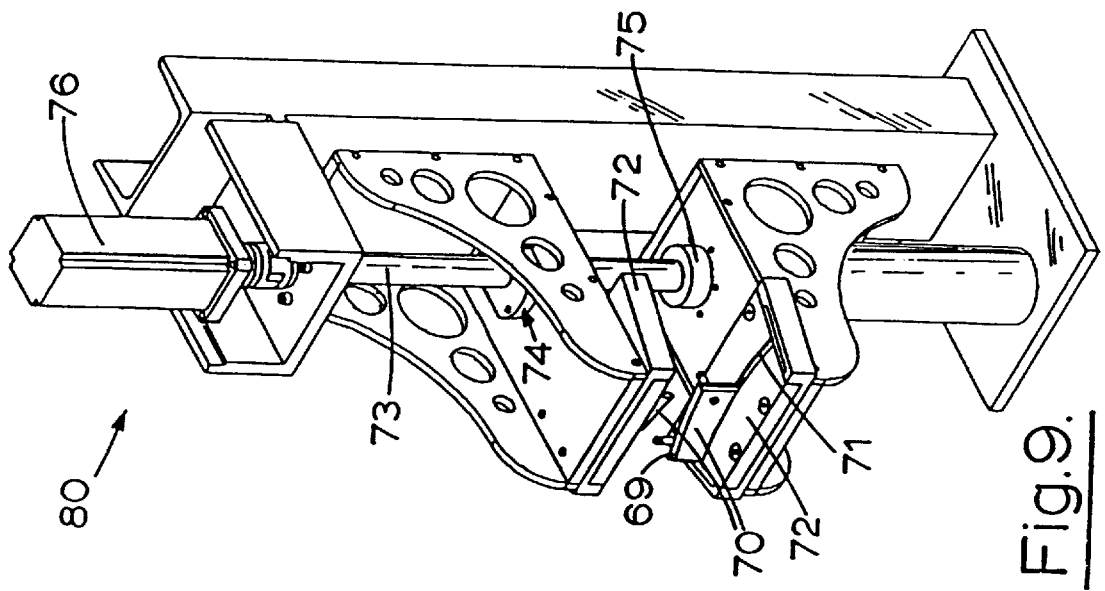
FIG. 9 is a perspective view of the splitting means of the apparatus of FIG. 1.

The splitting assembly 80 is illustrated in FIG. 9. As shown, each blade 70 is slidable for a short distance along a part circular mounting recess 71 and each is spring urged to the leading end of the respective mounting recess 71. The recesses 71 are formed in respective carriers 72 which engage with a threaded column 73 through respective ball screw assemblies 74 and 75. The threaded column 73 is driven by a servo motor 76.

When a nut is captured between the splitting blades 70, the blades 70 will move with the nut around the defined circular path 14 in the part circular recesses 71. This movement is sensed by suitable sensors to actuate the servo motor 76 which then rotates to further close the blades 70 about the nut to a predetermined extent, such as a few millimeters in the case of a macadamia nuts, in a sharp crushing action.

The blades 70 have their inner edges rounded so that this sudden crushing action is applied to the shell through the opposed faces of the tapered groove 79 whereby it jars the shell portions 77 and 78 apart, causing splitting of the nut about the base of the groove 79 and separation of the nut into individual portions 77 and 78. Thereafter the nut shell portions 77 and 78 are carried to the separation station at which they are moved apart retained on their respective gripping cups 36 and 37, allowing the kernel 76 to fall free for collection in a suitable storage bin.

The action of splitting creates substantially no extraneous particles or dust so that the kernels remain substantially uncontaminated and the shell parts are carried beyond the collection station to the dumping station 19 at which the vacuum applied to the gripping cups 36 and 37 is released to allow the shell portions to fall to a suitable bin. As shown in FIGS. 13C and 13D, should the kernel remain with either or both shells, it will be carried beyond the collection station to the dumping station so that only whole kernels will be collected.

The gripping assemblies 11 then pass from the dumping station 19 for commencement of another cycle of operations at the other side of the defined circular path 14. The motion of the support wheel 12 may be continuous ar intermittent, stopping when each gripping assembly 11 coincides with a process station. However it is preferred that continuous rotation be provided with a speed of rotation of the support wheel 12 in the order of 20 RPM, providing a throughput of eight nuts per second and a handling rate of about 200 kg per hour in the above described embodiment.

FIGS. 10 to 13 illustrate the sequence of operations described above. In FIG. 10A the nut 85 is elevated to the defined circular path 14 for capture between the gripping cups 36 and 37, as illustrated in FIG. 10B. At the grooving station 15, as illustrated in FIG. 11B, the blade 60 cuts into the nut shell which is counter-rotated by driving the cup 36 through the friction drive 90.

Figure 12A:
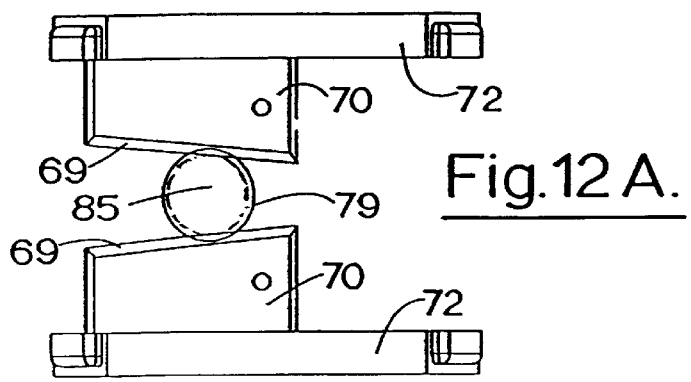
FIGS. 12A, 12B and 12C illustrate the splitting operation.
Figure 12B:
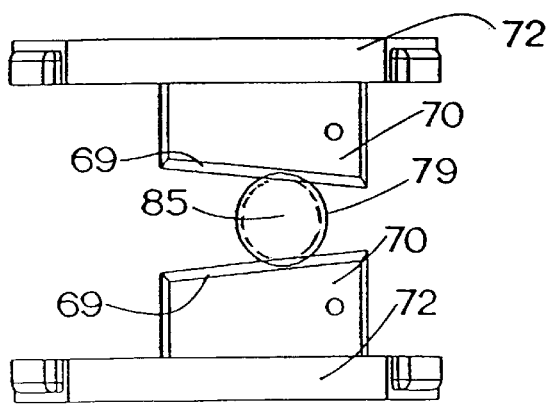
Figure 12C:
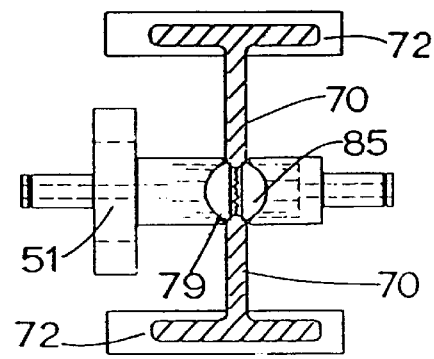

As illustrated in FIG. 12, the nut 85 feeds between the blades 70 until it engages each blade. Thereafter the blades 70 are carried with the nut 85, triggering the impact drive to cause splitting by separation of the shell portions at opposite sides of the groove 79. The gripping cups 36 and 37 are then separated while the vacuum is maintain in the cups to retain the shell portions 74 and 75 and allow the kernel to all to a collection station. Subsequently the vacuum is released and the shell portions 74 and 75 fall away, together with any retained kernel portion.

Figure 14:
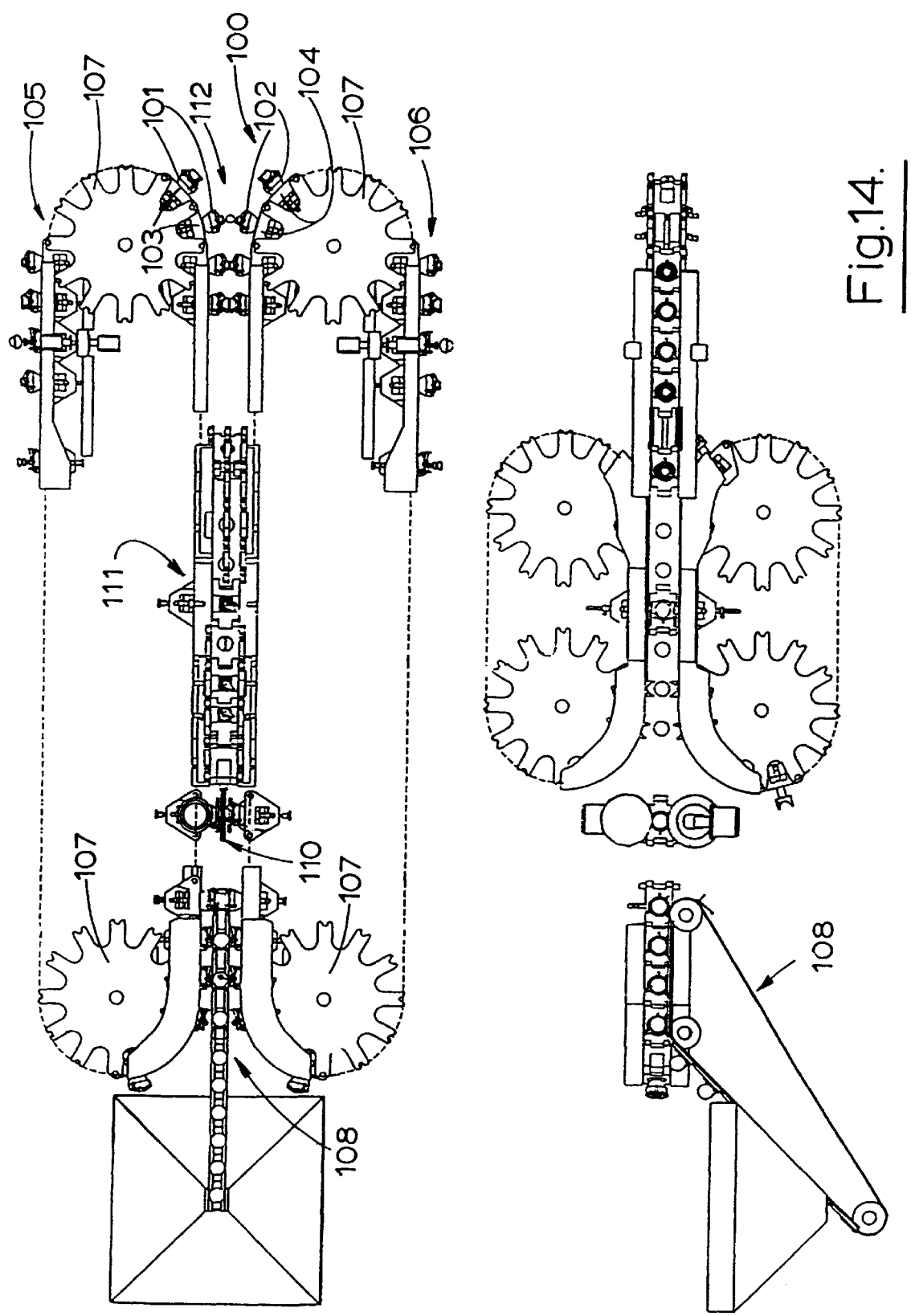
FIG. 14 is a plan and cutaway side view of a further embodiment of the invention.
Figure 15:
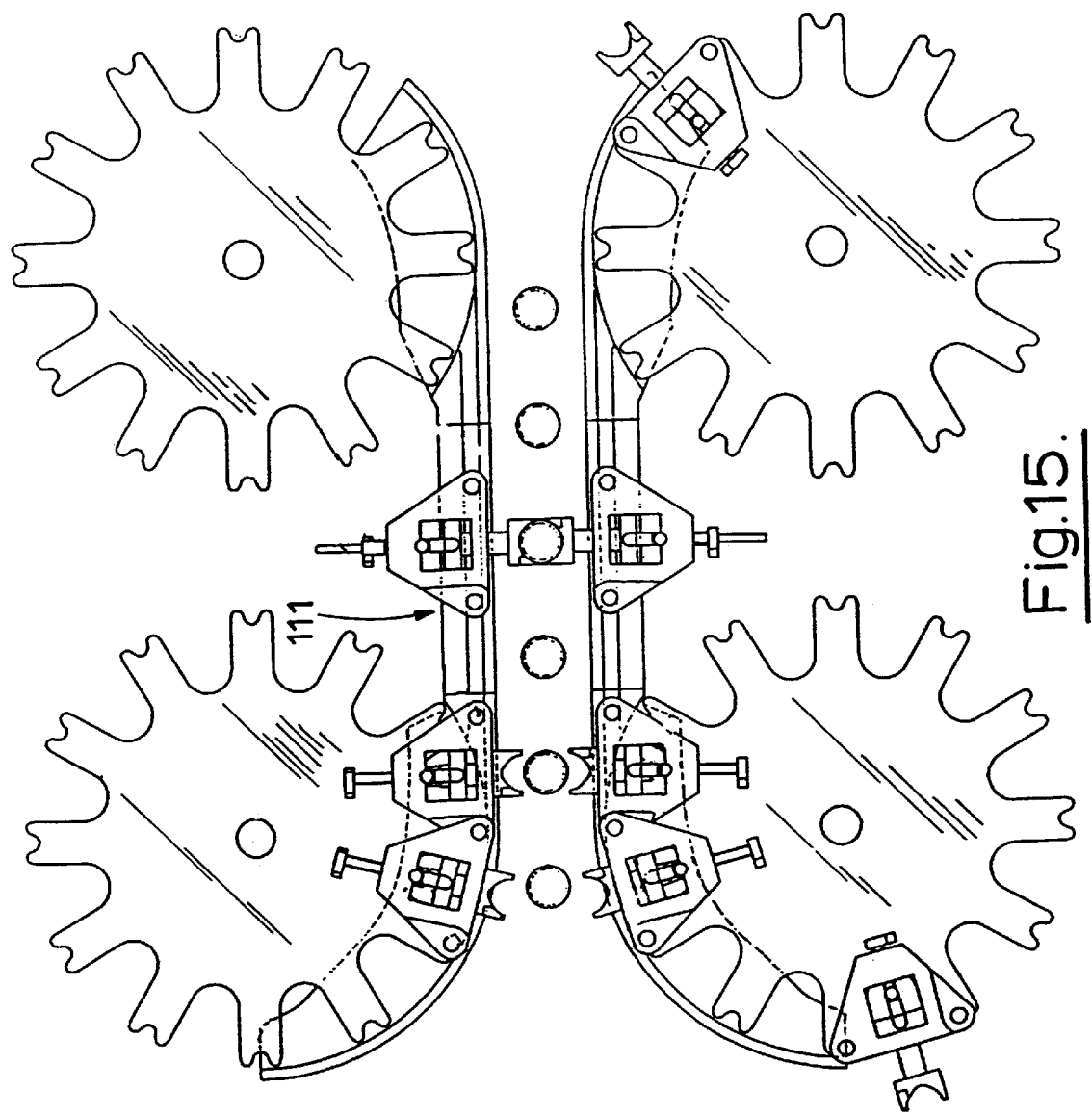
FIG. 15 illustrates the splitting means utilised in the embodiment of FIG. 14.
Figure 16:
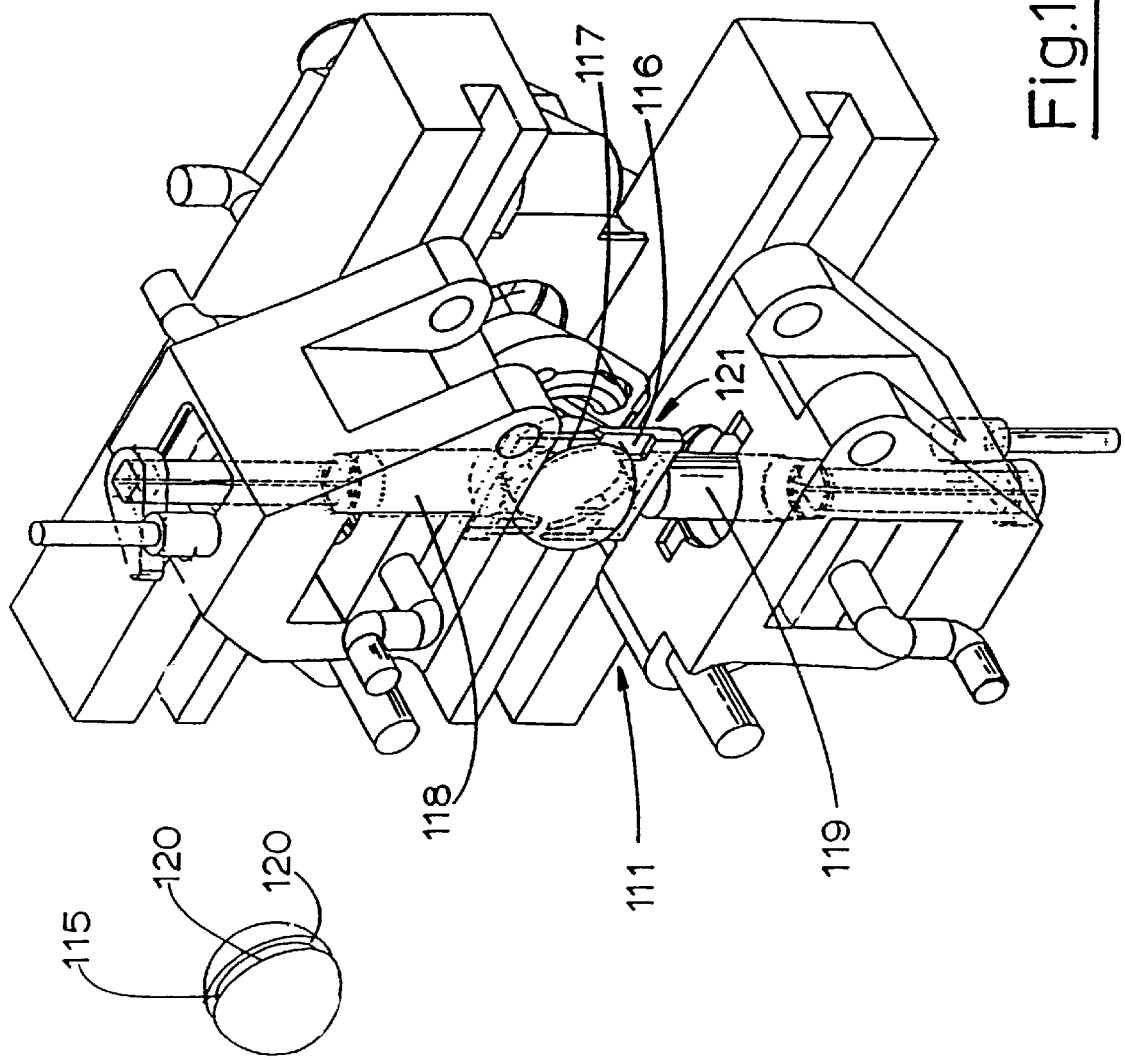
FIG. 16 illustrates the splitting apparatus utilised in the embodiment of FIG. 14.

In the embodiment 100 illustrated in FIGS. 13 and 14, the sets of cups 101 and 102 which grip the nuts to be process are mounted on the respective links 103 and 104 of opposed endless chain conveyors 105 and 106 supported by sprockets 107. The sprockets rotate in timed relationship to a loading conveyor 108 which delivers individual nuts into the converging path of respective opposed pairs of cups 101, 102 such that the nuts are gripped therebetween and carried past the grooving, splitting and unloading stations 110, 111 and 112 respectively. As shown in FIG. 16, the nut grooving saw forms a rectangular-section groove 115 in the nut shell and the splitting blades 116, 117 are mounted for rotation with respective shafts 118, 119 which move blades 116, 117 into encircling engagement with the nut within the groove 115. Thereafter the blades are twisted out of alignment with one another to provide a separating force against the nut groove walls 120 thereby splitting the nut, leaving the nut portions engaged with their respective gripping assemblies.

The profile of the splitting blade 116, 117 is adapted to receive a variety of nut diameters. The splitting blades are also rebated at 121 whereby the opposed splitting blades may interengage one another such that, when engaged, they extend about the full diameter of the nut.

The apparatus in accordance with the foregoing embodiments feeds nuts from a hopper by a feed belt which positions one nut at a time at a predetermined increment of 75 mm, the selected pitch of the driven chain assemblies. The system is a continuous system that allows macadamia nuts of any size to be split and the kernel to be recovered mostly without damage and with the maximum amount of whole kernel.

The kernel will generally be in the form of either whole kernel or half kernel. Once it is ejected from the shell it is collected on a conveying systems that delivers it to a size grading system where the kernels are sorted into wholes and halves of various sizes.

This embodiment carries out the process of separating the kernel from the shell without involving further complex equipment. It enhances the production of whole kernel and minimises the production of kernel halves. Practically, no chip or dust is carried with the extracted kernels, with dust extraction being provided at the grooving and splitting stations. Furthermore, each gripping assembly is in a modular form to allow for fast, simple replacement in case of breakdowns, minimising down-times.

It will be realised that while the foregoing has been given by way of illustrative example of this invention, all such and other modifications and variations thereto as would be apparent to persons skilled in the art are deemed to fall within the broad scope and ambit of this invention as is defined in the appended claims.

I claim:

1. Nut processing apparatus including:
   a loading station to which individual nuts are sequentially conveyed for processing;
   a nut gripper having opposed jaws between which a nut delivered to said loading station is gripped leaving a circumferential and substantially diametrical portion of the nut surface exposed therebetween;
   a conveyor for cyclically conveying said nut gripper from said loading station past grooving, splitting and unloading stations so as to present the conveyed nut shell exposed between said opposed jaws sequentially thereto;
   a groove former at said grooving station which forms a circumferential groove about an exposed surface of a nut shell;
   a splitter at said splitting station which co-operates with the formed circumferential groove to split the nut shell into opposed shell portions each retained by a respective jaw, and
   the jaws being moved apart at said unloading station to free the nut kernel.

2. Nut processing apparatus as claimed in claim 1, wherein said opposed jaws are opposed cups which co-operate to engage a nut therebetween.

3. Nut processing apparatus as claimed in claim 2, wherein said cups are provided with vacuum actuated retainers for pneumatically retaining respective nut portions therein.

4. Nut processing apparatus as claimed in claim 3, wherein both said cups are rotatable and one said cup is driven for rotation when disposed at said grooving station and said groove former is a rotary cutter which engages a rotating nut gripped between said cups to form said circumferential groove.

5. Nut processing apparatus as claimed in claim 4, wherein the other said cup is capable of orbital rotation about the drive axis of the driven cup.

6. Nut processing apparatus as claimed in claim 5, wherein said other cup is resiliently biased to a position co-axial with the driven cup.

7. Nut processing apparatus as claimed in claim 4, wherein said opposed cups are interconnected for corresponding movement to and from a set central position therebetween.

8. Nut processing apparatus as claimed in claim 7, wherein said nut groove former includes a grooving blade arranged to move towards said central position to form said groove.

9. Nut processing apparatus as claimed in claim 8, wherein said grooving blade has a cutting edge protruding beyond a penetration limiting peripheral land adjacent one side of the cutting edge.

10. Nut processing apparatus as claimed in claim 4, wherein pneumatic retention of the nut portions is maintained when said nut gripper is conveyed to said unloading station and said opposed cups firstly separate to enable the kernel to fall from the separated nut portions whereafter the vacuum retention is released to enable the respective nut portions to fall therefrom.

11. Nut processing apparatus as claimed in claim 7, wherein said conveyor is a support wheel and said gripper includes opposed cups mounted on said support wheel for corresponding radial movement to and from said central position.

12. Nut processing apparatus as claimed in claim 11, and adapted for processing macadamia nuts of between 18 mm diameter and 35 mm diameter.

13. Nut processing apparatus as claimed in claim 11, wherein said splitter includes a cracking member introduced to the groove to co-act with the opposed faces thereof.

14. Nut processing apparatus as claimed in claim 13, wherein said cracking member is a wedging member which is forced into engagement with said opposed faces of the groove.

15. Nut processing apparatus as claimed in claim 14, wherein said wedging member comprises one of a pair of opposed wedging members between which a nut supported by said nut gripper is conveyed so as to force apart said opposed faces.

16. Nut processing apparatus including:
   a rotary conveyor supporting a plurality of circumferentially spaced apart nut grippers radiating from a central hub;
   loading, grooving, splitting and unloading stations spaced sequentially around said rotary conveyor in the path of said nut grippers;
   each said nut gripper having opposed jaws supported for rotation about a radial axis and for opposed radial movement to and from a central position whereby a nut delivered to said loading station is gripped between said jaws leaving a circumferential and substantially diametrical portion of the nut surface exposed therebetween;
   a groove former at said grooving station which forms a circumferential groove at said central position of said exposed nut surface, and
   a splitter at said splitting station which co-operates with the formed circumferential groove to split the nut shell.

17. Nut processing apparatus as claimed in claim 16, wherein both said jaws are rotatable and one said jaw is driven for rotation when disposed at said grooving station and said groove former is a rotary cutter which engages a rotating nut gripped between said jaws to form said circumferential groove.

18. Nut processing apparatus as claimed in claim 17, wherein the other said cup is capable of orbital rotation about the drive axis of the driven cup.

19. Nut processing apparatus as claimed in claim 17, wherein said opposed jaws are opposed cups provided with vacuum operated retainers adapted to pneumatically retain respective nut portions therein and wherein the nut shell portions are retained after separation of the opposed cups so as to free the kernel therefrom until the conveyor has advanced the cups to a shell discharge station.

20. Nut processing apparatus as claimed in claim 19, and including a sensor for sensing adherence of kernel parts to a shell portion whereby such split nuts may be retained for advancement to an alternate discharge station.

21. Nut processing apparatus including:

a loading station to which individual nuts are sequentially conveyed for processing;

a nut gripper having opposed jaws between which a nut delivered to said loading station is gripped leaving a circumferential and substantially diametrical portion of the nut surface exposed therebetween;

a conveyor for conveying said nut gripper from said loading station past grooving, splitting and unloading stations so as to present the conveyed nut shell exposed between said opposed jaws sequentially thereto;

a groove former at said grooving station which forms a circumferential groove about an exposed surface of a nut shell;

a splitter including opposed wedging members between which the grooved nut is fed so that the wedging members progressively enter the formed circumferential groove to split the nut shell, and the jaws being separated at said unloading station to move the split shell portions apart to free the kernel.

22. Nut processing apparatus as claimed in claim 21, wherein said wedging members are forced into engagement with said opposed faces and impacted to effect splitting of the shell about the groove.

\* \* \* \* \*